United States Patent Office 3,222,280
Patented Dec. 7, 1965

3,222,280
LUBRICANTS HAVING IMPROVED COHESIVENESS AND ADHESIVENESS
George Wolfram, Des Plaines, and Theodore H. Szawlowski, Wonder Lake, Ill., assignors, by mesne assignments, to Union Oil Company of California, Los Angeles, Calif., a corporation of California
No Drawing. Filed Dec. 26, 1961, Ser. No. 162,201
16 Claims. (Cl. 252—32.7)

This invention relates to a novel and improved oleaginous or viscous residual oil composition or gear lubricants having superior adhesive and cohesive characteristics and to the method of preparation of such compositions. More particularly, this invention relates to oleaginous or viscous residual oil compositions or gear lubricants containing a small amount of mixed polymeric polyethers and polyesters prepared by the reaction of an epoxy resin and certain complex high-molecular-weight carboxylic acids derived from solvent extracts obtained in the solvent refining of mineral lubricating oils by metalation, carbonation and acidification. The oleaginous or gear lubricant compositions of this invention are distinguished from conventional gear lubricants in that the herein-described modified polymeric polyethers and polyesters are used in place of the commonly used wood rosin or other tackiness agents to impart superior tackiness and cohesiveness to the lubricant.

It is known in the art that one of the most important characteristics of certain lubricants, such as those used on wire rope, open gears, and so forth, is the ability to remain on the exposed members of such assemblies. Such lubricants must possess sufficient tackiness to adhere to the metal and non-metal components and yet be sufficiently fluid to permit unrestricted operation of the moving members. In the case of wire ropes, the lubricant must adhere to the surfaces thereof without making them inflexible or otherwise impeding their use. In addition to being adhesive toward metals, the lubricant must also be cohesive, that is, it must stick to itself as well as to the machine component or rope so that a coating of adequate thickness can be maintained. In the formulation of this type of lubricant, an adequate balance of adhesion and cohesion is essential. Although there are available many materials which attain this result, many are prohibitive costwise. Furthermore, the progress of petroleum technology has resulted in a reduction of the available supply of certain of these addends, particularly the less costly ones and substitutes have had to be provided.

It is accordingly a primary object of this invention to provide a new and improved, adhesive petroleum lubricant which derives its adhesive characteristics from mixed polymeric polyethers and polyesters which have been prepared by reaction with a mixture of epoxy resins or resin intermediates and extract mono- di and polycarboxylic acids derived from solvent extracts.

Another object of this invention is to provide a new and improved, adhesive, petroleum lubricant which is more adherent for a given amount of adhesive addend used than in previous compositions.

A feature of this invention is the provision of a new and improved, adhesive, petroleum lubricant composed of viscous lubricating oil residues containing a small amount of epoxy resins modified with carboxylic acids derived from solvent extracts by metalation, carbonation and acidification with an acid.

Other objects and features of this invention will become apparent or be described as the specification proceeds.

In gear lubricants which are intended for use at high loads and elevated temperatures the requirements of adhesiveness, cohesiveness, and high film-strength are even more desirable because the retention of a lubricant on the rubbing surfaces is more difficult. Often agents which impart tackiness, adhesiveness, or cohesiveness to the composition do not possess sufficient film strength under adverse conditions, i.e., high load and elevated temperatures, to be effective. Where the lubricant is to be applied by brushing, spraying, or dipping, particularly if the applications are intermittent, these properties become paramount.

Conventional tackiness agents, though effective, such as wood rosin, are subject to fluctuations in availability and price, and often do not form satisfactory lubricants for such diverse application as wire-rope lubricants and E.P. gear lubricants. Consequently, a number of potential substitutes for conventional tackiness agents, such as wood rosin, have been tested in the past with little success.

This invention is based on the discovery that the modified or partially polymerized epoxy resin disclosed in and prepared by the process of copending application Serial Number 162,279, filed on even date herewith, by T. H. Szawlowski, has the unusual property of imparting and accentuating metal adhesiveness to and internal cohesiveness of oleaginous vehicles and viscous residual oils, when compounded therewith in amounts ranging from about 0.1 to 10% by weight, based on the total weight of the composition. The invention has particular application to compositions containing the aforesaid proportions of the modified epoxy resins of said copending application, wherein the oleaginous vehicle is a residual oil, such as, asphalt or solvent extracts from the manufacture of mineral lubricating oils, as herein more fully described in relation to the derivation of the modified epoxy resins, and said oleaginous vehicle has some inherent adhesion and cohesion properties which are amplified by said relatively small amounts of modified epoxy resin.

Also, in accordance with this invention, we have found that a petroleum lubricating composition characterized by its adhesiveness, cohesiveness, and high film-strength can be compounded by incorporating small amounts, or amounts sufficient to impart adhesiveness, in the order of 0.1 to 1.0% by weight and preferably about 0.2 to 0.5% by weight, of the reaction, polymerization, or modification product of an epoxy-resin intermediate and certain complex, high-molecular-weight mono-, di-, and polycarboxylic acids prepared by metalation, carbonation, and acidification of solvent extracts obtained in the solvent refining of mineral lubricating oils, in an oleaginous liquid, e.g., a mineral lubricating oil residual oil, mixtures of residual oils or a conventional gear oil lubricant.

A feature of this invention is the provision of a new and improved, adhesive, petroleum lubricant composed of viscous lubricating oil residues containing a small amount of expoxy resins modified with carboxylic acids derived from solvent extracts by metalation, carbonation and acidification.

Other objects and features of this invention will become apparent or be described as the specification proceeds.

THE MODIFYING COMPLEX CARBOXYLIC ACID

The modifying complex carboxylic acids or acid mixtures used in accordance with this invention are prepared in accordance with the processes disclosed in copending application, Serial No. 819,932, filed June 12, 1959, now abandoned by Thomas W. Martinek and Serial No. 79,661, filed December 30, 1960, now U.S. Patent No. 3,153,087, by Messrs. W. E. Kramer, L. A. Joo and R. W. Haines.

These acids are further described in related copending applications, Serial No. 79,541, filed December 30, 1960, now U.S. Patent No. 3,154,507, by Messrs. W. E. Kramer and L. A. Joo, and Serial No. 79,506, filed December 30, 1960 by Thomas W. Martinek.

In accordance with said copending application the complex, polynuclear, aromatic, and alkaromatic carboxylic acids used to prepare the novel compositions of this invention are derived by metalation, carbonation, and acidification of a source of complex, polynuclear, aromatic nuclei.

The resulting complex acids, hereinafter referred to as extract acids, or EPA, are mixtures of mono-, di-, and polycarboxylic acids. Through chemical analysis, characterization and study of the physical and chemical properties, by way of illustration only, the exact acids can be represented by the following formulae:

MONOBASIC ACIDS

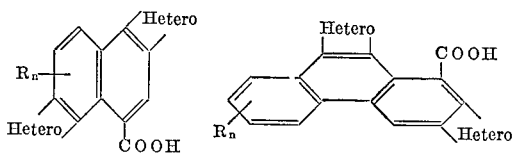

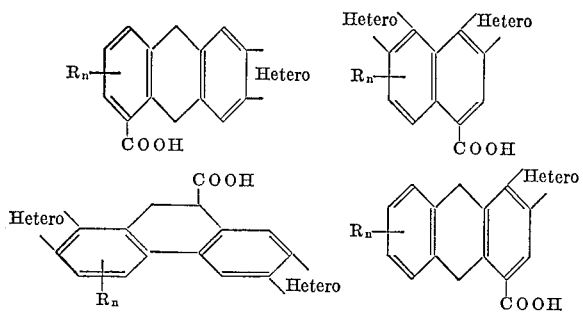

DIBASIC ACID

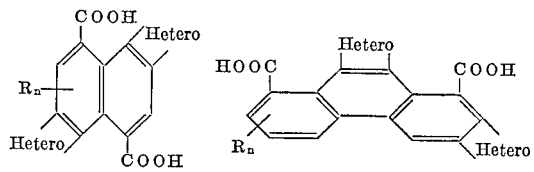

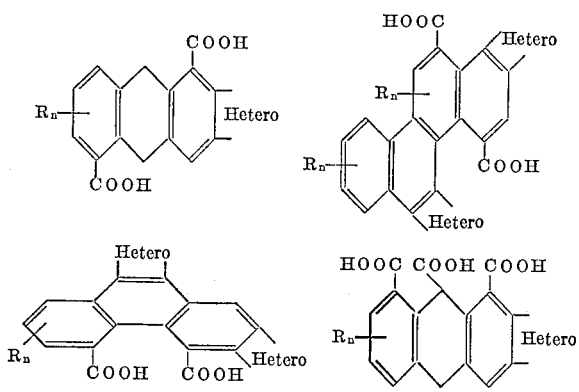

EXACT ACIDS

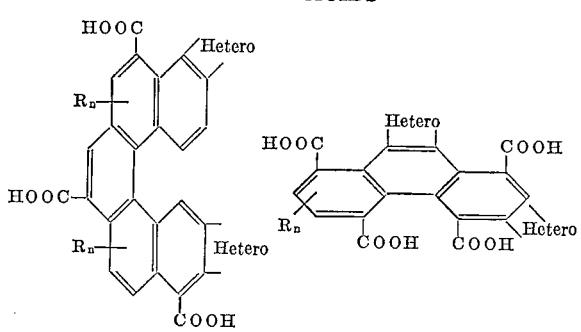

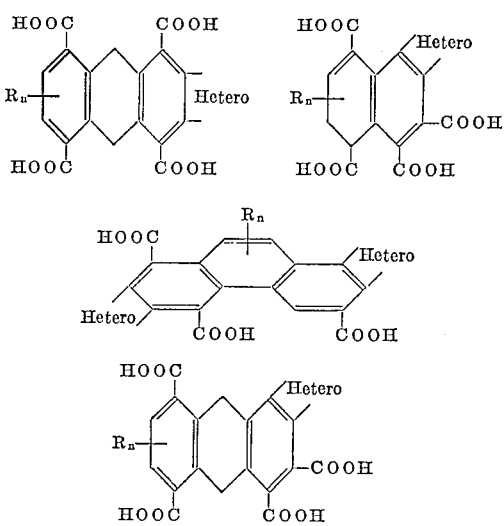

wherein "Hetero" illustrates one or more S-, or O-, containing heterocyclic ring substituents, R is an alkyl or cycloalkyl radical having a total of 15 to 22 carbon atoms for each nuclei, and $n$ has a value of 3 to 10. The molecular weight of the exact acids ranges from about 300 to 750, and the average molecular weight is about 325–470. Table I gives representative physical and chemical properties of the extract mono-, di-polycarboxylic acids to be used in accordance with this invention.

TABLE I

| Property: | Value |
|---|---|
| Av. mol. wt. range | 325–470. |
| Acid number | 140–300. |
| Melting point | 60–100° C. |
| Bromine No. | 16–24. |
| Percent sulfur | 1.05–2.5. |
| Color | Deep red-dark brown. |
| Percent unsaponifiables | 2.8. |

In the mixture of acids produced by metalation, carbonation, and acidification of solvent extracts, the monobasic acid derivatives constitute from 5–9% by weight, the dibasic acids constitute from 5–95% weight and the polybasic acids, that is those acids containing from 3 to as high as 7 carboxyl groups, make up from 0 to 20% by weight. In the preferred embodiment of the invention, the mixture of acids produced by metalation, carbonation, and acidification of solvent extracts from the manufacture of refined mineral lubricating oils may be used although fractions of such acids, such as those prepared by the method of copending application, Serial No. 161,355 filed Dec. 22, 1961, may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of alkali metal, such as sodium, potassium, cesium, lathium, and rubidium, and their mixtures and amalgams, at a temperature of about 60° to 80° C. in the presence of a reaction solvent such as dimethyl glycol ether, a dimethyl ether, methylalkyl ethers, dialkyl glycol ethers, tetrahydrofuran, methylal, and trimethylamine. The formation of the adduct is promoted by shearing and agitation, providing an excess of alkali metal, using a preformed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkalimetal salt of the complex acid which, upon acidification with a mineral acid, yields the desired complex, polynuclear carboxylic acids in good yields. To illustrate, the following non-limiting examples are given.

*Example I*

One hundred gms. of extract oil No. 19 (Table I) from the preparation of 170 vis., 100 VI neutral oil, dissolved in 675 cc. of dry tetrahydrofuran, was reacted with agitation at 10° to 30° C. with 8.3 gms. of metallic sodium in the form of 3/16″ cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

*Example II*

One hundred gms. of extract oil No. 19 (Table I) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, 5/16″ in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

*Example III*

The process of Example II was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average.

*Example IV*

The various recovered acids of application Serial No. 819,932, illustrated in Table II therein, are further examples of mono-, di,- and polycarboxylic acids to be used to prepare the modified epoxy resins to be used as adhesive agents in accordance with this invention.

*Example V*

The various carboxylic acid products described in Runs 12 through 47 of application Serial No. 79,661 are further examples of acids that may be used.

In order to further illustrate the complexity and types of modifying acids that can be used in accordance with this invention the following tabulation is given:

TABLE II.—TYPICAL PROPERTIES OF A NUMBER OF EXAMPLE COMPLEX ACIDS (EPA)

| No. | Sap. value | Mol. wt. | Percent S | Br. No. | Percent unsap. | Eq. wt. | Eqs./mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 217 |
| 46 | | 390 | | | 4.2 | | | 191 |
| 49 | | 365 | | | 5.4 | | | 218 |
| 51 | | 455 | | | 5.5 | | | 186 |
| 53* | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |

*This EPA was used in the examples set forth herein.

The starting material for the reaction to prepare the complex modifying acids may be any complex, polynuclear, and/or heterocyclic aromatic hydrocarbon from synthetic or natural sources. A preferred and unique source of aromatic starting material comprises petroleum fractions rich in more complex, polynuclear, aromatic hydrocarbons, not only because the mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di-, and polybasic carboxylic acids, or their mixtures, of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds. The solvent extracts illustrated herein are also examples of the oleaginous vehicle which can be all or part of the compositions of this invention.

The complex hydrocarbons removed by this refining treatment often contain appreciable amounts of combined sulfur, nitrogen, and oxygen. These complex hydrocarbons contain a predominance of polynuclear rings of aromatic structure, and of condensed configurations having hydrocarbon substituent groups attached thereto as side chains. These starting materials are of a generally viscous nature, have low viscosity indices, low resistance to oxidation, and are considered to be deleterious in lubricating oils. Heretofore, solvent extracts have been regarded as waste products, and because they are exceedingly complicated mixtures of complex compounds, including various sulfur-, oxygen, and nitrogen-containing compounds, they have not been used successfully in preparing petrochemicals or as sources of hydrocarbon reactants or starting materials.

Since the general process of refining mineral lubricating oil in which solvent extracts are obtained is well known, and is related in detail in said copending applications, e.g., applicatiobn Serial Number 162,279, it is only necessary for present purposes to give some examples by way of illustration. Following are the physical characteristics of typical extract products, from lubricating oil stocks derived from various crude oils and other source hydrocarbon materials, which may be used to prepare extract acids for modifying epoxy resins to be used as adhesive adducts for the compositions of this invention.

based on these analysis, is illustrated by the following table:

TABLE V.—ESTIMATED CHEMICAL COMPOSITION OF SOLVENT EXTRACTS NOS. 19, 21, 43 AND 44 OF TABLE III

Type of compound:     Approx. percent in the extract
- Saturated hydrocarbons _____ 12.5
- Mononuclear aromatics:
  - Substituted benzenes _____ 25.0
- Dinuclear aromatics:
  - Substituted naphthalenes _____ 30.0
- Trinuclear aromatics:
  - Substituted phenanthrenes _____ 10.0
  - Substituted anthracenes _____ 5.0
- Tetranuclear aromatics:
  - Substituted chrysenes _____ 00.5
  - Substituted benzphenanthrenes _____ 0.2
  - Substituted pyrenes _____ 0.2
- Pentanuclear aromatics:
  - Perylene _____ 0.01
- Sulfur compounds,* oxygen compounds, etc __ 16.5

* Mainly heterocyclic compounds. The average mol. wt. of Extracts 19 and 21 is 340, and that of Extracts 20 is 590.

TABLE III.—SOURCES AND PHYSICAL CHARACTERISTICS OF SOLVENT EXTRACTS

| Ext. No. | Crude Source | Solvent | API Grav. | Sp. Gr. at 10° F. | Vis/100 °F. | Vis/130 °F. | Vis/210 °F. | V.I. | °F. Pout | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.06 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | |
| 9 | Santa Fe Springs | do | 10.2 | 0.9984 | | | 371 | | +65 | 520 | 600 | 69.4 | | 2.88 |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.8 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | | 5.5 | 2.3 |
| 43 | do | do | 11.1 | | 1,054 | 331 | 61.5 | −56 | +40 | 435 | 475 | 37.5 | 0.4 | 2.7 |
| 44 | do | do | 7.7 | | 2,007 | 611 | 71.1 | −128 | +35 | 420 | 495 | 40.0 | 0.86 | 3.2 |
| 45 | do | do | 7.3 | 1.019 | 230,000 | 20,800 | 796 | −76 | +65 | 520 | 610 | 38.6 | 7.7 | 3.0 |

Extract No. 41 was obtained in the production of 85 Vis neutral, had an average molecular weight of 300, and contained 76.8% aromatics (by the silica gel procedure).
Extract No. 42 was obtained in the production of 150 Vis Bright Stock, had an average molecular weight of 590, and contained 86% aromatics, 14% saturates, 86.2% carbon, and 11.4% hydrogen, and averaged 3.3 aromatic rings per aromatic molecule.
Extract No. 43 was obtained in the production of 170 Vis neutral, had an average molecular weight of 340, contained 84.1% aromatics, 15.9% saturates, 86.4% carbon, and 10.7% hydrogen, and averaged 2.7 aromatic rings per aromatic molecule.
Extract No. 44 was obtained in the production of 200 Vis neutral, had an average molecular weight of 340, and contained 87% aromatics and 13% saturates.
Extract No. 45 was obtained in the production of 160 Vis Bright Stock and contained 92% aromatics and 8% saturates.

The solvent extracts from lubricating oils used as starting materials for this invention have the following general properties and characteristics:

TABLE IV

| Characteristic: | Range of value |
|---|---|
| Gravity, ° API | 7.3–18.3 |
| Gravity, sp., 60/60° F. | 0.945–1.022 |
| Viscosity SUS @ 210° F. | 40–1500 |
| Viscosity index | −128–+39 |
| Pour point (max.) ° F. | +35–+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds, percent by vol. | 20–50 |
| Aromatic compounds | 25–90 |
| Neutral aromatic hydrocarbons | 40–51 |
| Av. no. of rings/mean arom. mol. | 1.7–3.5 |

The complexity of the types of compounds present, as

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

Without limiting the invention, the characteristics of the adhesive-cohesive products of this invention as influenced by the complex acids are further disclosed as thus far evaluated. The mono-, di-, and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl substitutents varies between 15 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures. Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$ and 31–47% $C_p$ using the method of Kurty, King, Stout, Partikian and Skrabek (Anal. Chem., 28, 1928 (1956)). They are soluble in ethyl ether, acetone, methyl ethyl ketone, tetrahydrofuran, benzene, toluene, and xylene.

THE EPOXY RESINS AND INTERMEDIATES

Epoxy resins have well-known and valuable properties, and are widely used as encapsulating compounds, laminates, structural forms, and the like. Generally, the polyepoxy-resin intermediates of the prior art are cured with polyamines, dibasic acids, polyamides, and the like. For this purpose, the curing agents are used in stoichiometric amounts based on the number of epoxide groups in the polyepoxy intermediate resin.

Because these epoxy resins are expensive, other less expensive resins are frequently used in combination therewith as extenders. Such extenders include phenyl-formaldehyde resins, aniline-formaldehyde resins, polyester resins, polyvinyl chlorides, urea-formaldehyde resins, melamineformaldehyde resins, and the like. These extenders, depending upon their properties and the conditions of the reaction, may or may not cross-link with the polyepoxy resin. Furthermore, these extenders usually cause significant differences in the properties of the finished resin. Epoxy resins have also been added to asphalts to obtain products of certain desired properties.

The polyepoxy resin intermediate used in preparing the partially polymerized, adhesive, resinous compositions of this invention can be any of the broad class of polyepoxides known to be useful in preparing cured resins. In general, these polyepoxides are straight-chain polymers prepared from low-molecular-weight diepoxides and contain an epoxide group at each end of the chain. The epoxy resins contemplated by this invention range from ethylene oxide polymerization products to the newest class of these materials, as prepared from monomers having two or more reactive epoxide groups in the monomer structure, or epoxidized polyolefins.

The epoxy monomers are available commercially, both in liquid and solid forms (the term "monomer" as used herein includes compositions which are strictly monomeric or which are partially polymerized or contain small amounts of polymers), and are polymerized by addition of curing agents which include primary, secondary, and tertiary amines, and polyfunctional compounds such as glycols, polyglycols, polyamines, polyamides, and carboxylic acid anhydrides. The resins which are prepared by curing epoxy resin monomers are cross-linked resins of the thermosetting type and are characterized by high chemical and thermal stability at high tensile and impact strength. The resins are prepared by addition to the epoxy monomer of a small amount of a curing agent. The curing agent is added to the epoxy resin in an amount which is effective for the particular resin to promote the hardening of the resin. The selection of the particular curing agent is determined by the characteristics of the epoxy resin composition and the proportion of the curing agent may vary widely, although the use of about 5–20% wt. of the curing agent is preferred. The polyepoxides used in accordance with this invention can be of the aliphatic or aromatic type.

The epoxy resin used in formulating the adhesives used herein may be any of the polyepoxides known in the prior art as being useful in the preparation of solid resins by curing with dibasic acids. In general, aliphatic and alicyclic polyepoxides such as the commercially available Epon series, Oxirons, Union Carbide Epoxides, and Swift's Epoxol series, result in adhesives having flexibility and tackiness superior to those prepared from aromatic epoxy resins. Specific and general chemical descriptions of these proprietary products may be found in The Condensed Chemical Dictionary, Fifth Edition, Reinhold, 1956, and Modern Plastic, September 1960, volume 38, No. 1A.

Tertiary amines suitable for use as the catalysts in preparing our adhesives include pyridine, or picoline, quinolines, such as quinoline, isoquinoline, quinaldine, trialkyl amines, alkyl-aryl amines, alkyl-substituted amino-phenols and other heterocyclic bases.

Preferably, the polyepoxide used as the starting material is aliphatic in chemical character.

Thermosetting synthetic resins formed by the polymerization of an ethylene oxide derivative containing at least two ethylene-oxide groups in the molecule, in the presence of inorganic or organic bases (as described in U.S. Patent 2,444,333), can be used in accordance with this invention. These resinous condensation products are prepared by the reaction between epihalohydrin, for instance, epichlorohydrin,

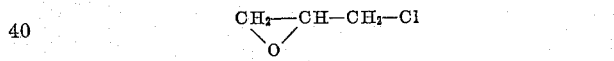

and bis-(4-hydroxyphenyl) dimethylmethane, commonly known as "Bis-phenol A," prepared by the condensation of 2 moles of phenol with 1 mol of acetone and having the formula,

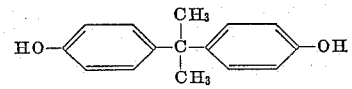

with or without an organic compound corresponding to the general formula ZCNRNCZ, where R is a divalent organic radical free of functional groups other than the two NCZ groups and Z is a member selected from the class consisting of oxygen and sulfur.

The diphenol product is then reacted with epichlorohydrin in the presence of caustic to yield the diglycidyl ether in accordance with the equation:

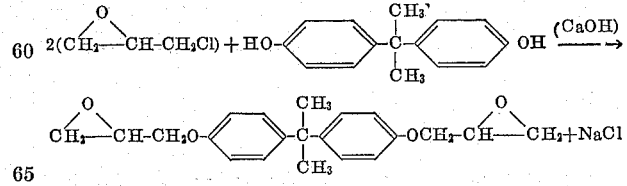

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide, and divinylbenzene diepoxide, and diglycidyl ether.

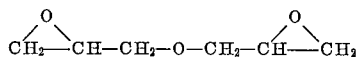

Other diglycidyl ethers include those produced by reaction of epichlorohydrin with other polyhydroxy compounds such as resorcinal, hydroquinone, pyrocatechol, saligenin, phloroglucinol, bisphenol F, trihydroxydiphenoldimethylmethane, fluor-4-dihydroxybiphenol, long-chain bisphenols, 4,4'-dihydroxydiphenol sulfone, Nevillac resins (a proprietary product), ethylene glycol, and higher glycols, glycerol, erythritol, pentaerythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, suberic acid, pinelic acid, etc. In the copending application of Walter E. Kramer and Louis A. Joo, Serial No. 58,638, filed September 27, 1960, now U.S. Patent 3,056,763, issued October 2, 1962, the diepoxy esters of 4,4'-tetrahydrodipyridil dicarbamic acid (and analogs thereof), are disclosed as being novel epoxy resin monomers.

The resinous condensation products thus formed, which are prepared by one method in accordance with U.S. Patent 2,444,333 infra, are known as "Epon" resins which range from solids to viscous liquids having molecular weights in the order of about 1000 to 3000. In one form, this condensation reaction is carried out by employing a ratio of epihalohydrin to the bis-phenol at slightly below or around 2:1. Also, resinous products prepared in accordance with U.S. Patent 2,594,979 can be used.

According to generally accepted theories regarding the effect of tertiary amine catalysts on heated mixtures of epoxy resins and dibasic acids, two types of reactions are catalyzed. In the first type, the epoxide intermediates are polymerized to form polyether structures which may be represented as:

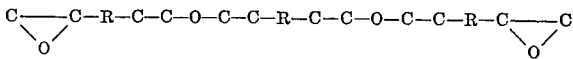

In the second type, the epoxide ring of the epoxide intermediate is opened and combined with the dibasic or polybasic acid to form polyesters which may be represented as:

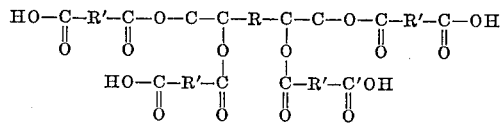

While our invention is not to be limited by any postulation of mechanism, it appears probable that both of these types of reactions occur and contribute to the properties of the adhesives.

While resin adhesives of this invention can be prepared with some success by conventional techniques, best results are obtained by a process described in copending application Serial Number 162,279 consisting of the steps of:

(1) Dividing the total required amount of "extract acid" into three or four equal portions;

(2) Mixing the total amount of epoxy intermediate with one of the portions of "extract acid" and the catalytic amount (about 0.5–1.5% w.) of tertiary amine;

(3) Heating and stirring the mixture until foaming subsides (the polymerization and polyesterification reactions cause foaming and the development of a black color);

(4) Separately adding the remaining portions of "extract acid," allowing time for the reaction to become complete with each addition before making the next addition; and (5) Heating and stirring the mixture for several minutes (3–5 usually suffice) after foaming has ceased following the last addition of acid.

In order to illustrate, several different adhesives and cohesive compositions were prepared by the above procedure with the following constituents:

TABLE VI

| Example VI: | | Example VII: | G. |
|---|---|---|---|
| Epon 812 | 10.0 | Epoxide 201 | 10.0 |
| EPA | 7.0 | EPA | 3.9 |
| Pyridine | 0.15 | Pyridine | 0.15 |
| Example VIII: | | Example IX: | |
| Epon 812 | 4.0 | Epon 812 | 7.0 |
| Epon 820 | 6.0 | Epon 830 | 3.0 |
| Epichlorohydrin | 2.0 | Epichlorohydrin | 2.0 |
| EPA | 8.0 | EPA | 9.0 |
| Pyridine | 0.15 | Pyridine | 0.15 |
| Example X: | | Example XI: | |
| Oxiron 2001 | 10.0 | Epoxide 201 | 10.0 |
| Epichlorohydrin | 2.0 | EPA | 6.0 |
| EPA | 6.0 | Pyridine | 0.15 |
| Pyridine | 0.15 | Example XIII: | |
| Example XII: | | Epon 812 | 8.0 |
| Epon 812 | 10.0 | Epichlorohydrin | 2.0 |
| EPA | 10.0 | EPA | 10.0 |
| Pyridine | 0.15 | Pyridine | 0.15 |

Table VII shows the results of adhesive tests as applied to the modified epoxy resins in comparison with commercial products.

TABLE VII

| Example Number | Composition | Peeling force * (grams) | Comments |
|---|---|---|---|
| Masking tape | | 400–410 | Commercial tape. |
| Cellophane tape (Scotch). | | 580–690 | Do. |
| Black friction tape. | | 295–300 | Do. |
| VI | Epon 812, EPA. | 215–230 | Very tacky; like rubber cement. |
| VII | Epoxide 201, EPA. | 135–140 | Very light adhesive. |
| VIII | Epon 812, Epon 820, Epichlorohydrin, EPA. | 820–830 | Slight warming needed to apply tape. |
| IX | Epon 812, Epon 830, Epichlorohydrin, EPA. | 660–720 | Tape applied at room temperature. |
| X | Oxiron 2001, Epichlorohydrin, EPA. | 525–540 | |
| XI | Epoxide 201, EPA. | 1,000–1,010 | Warming needed to apply tape. |
| XII | Epon 812, EPA. | Over 1,200 | Do. |
| XIII | Epon 812, Epichlorohydrin, EPA. | Over 1,200 | Do. |

* Peeling force is force required to pull a one inch tape from a standard steel plate surface.

The epoxy resin intermediates used in these example compositions are well known.

"Epon" resins are proprietary products of Shell Chemical Company, Plastics and Resins Division. All of them possess terminal epoxide groups, and are known as epoxy-type resins. The primary difference among the various types of "Epon" resins is molecular weight, which increases as the identifying number increases. With the exception of Epon 812, which is an aliphatic modification, all of the members of the "Epon" series are aromatic in character. The epoxide equivalents of the Epon products used in these examples are as follows:

TABLE VIII

| | Epoxide equivalent [1] |
|---|---|
| Epon 812 | 140–160 |
| Epon 820 | 180–195 |
| Epon 830 | 190–210 |

[1] Grams of resin containing one gram-equivalent of epoxide.

Epoxide 201, a proprietary product of Union Carbide Chemical Co., is 3,4-epoxy-6-methylcyclohexylmethyl-3,4-epoxy-6-methyl-cyclohexane carboxylate:

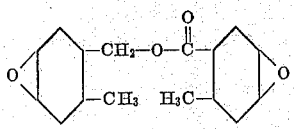

Oxiron 2001, a proprietary product of Food Machinery and Chemical Corporation, Epoxy Department, is an epoxy resin having, in simplified form, the structure:

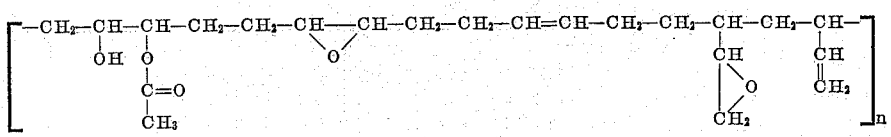

It has an epoxy equivalent, i.e., the number of grams of resin containing 1 gram mole of epoxide, of 145.

Any of the foregoing substantially completely or partially polymerized epoxy resins illustrate additives useful in the compositions of this invention.

In preparing the adhesive compositions of this invention by conventional techniques, the polyepoxy resin intermediate is heated with a nonviscous epoxide and the extract acids, (EPA) at a temperature of about 250 to 370° F. in the presence of a tertiary amine. The nonviscous epoxide serves primarily as a viscosity-reducing agent and also generates during the reaction a partially polymerized product which acts as solubilizing agent to increase the extent to which the acids of the EPA react with the epoxy phase. Accordingly, the relative amounts of polyepoxide intermediate and the epoxide diluent are not critical, but are dependent upon the characteristics of the EPA used and upon the degree to which the polymerization reaction is to be extended or otherwise processed. For purposes of this invention, suitable nonviscous epoxide diluents include epichlorohydrin, phenyl glycidyl ether, dicyclopentadine dioxide, vinyl cyclohexene dioxide, resorcinol diglycidyl ether, etc.

The relative amounts of EPA, polyepoxide resin intermediate, and epoxide diluent are selected so that the concentration of the reacting EPA carried into the final product is no greater than about 50% by wt. The lowest concentration of the EPA in the end product which still retains the benefits of this invention is about 10%. Higher or lower concentrations of EPA incorporated are likely to result in unsuitable polymerization reaction products or other difficulties in the useful quality of the product. The amount of tertiary amine or other catalyst used will vary from about 0.2% to 1.5% of the total charge. The presence of the amine catalyst causes partial polymerization of the polyepoxide-resin intermediate and the epoxide diluent as well as aiding in the esterification with EPA. As seen from Examples VI and VII, the reaction can be carried out using a tertiary-amine catalyst or other catalyst, alone without the epoxide diluent. Also, the reaction can be carried out without using the tertiary-amine catalyst.

After the polyepoxide intermediate (with or without the amine catalyst and with or without the epoxide diluent) has been contacted with the EPA for a period of about 10 minutes to 3 hours, the agitation and heating is stopped and the mixture allowed to cool. The product becomes an adhesive, tacky resin mixture.

By incorporating a small amount of the aforedescribed polymerized, or partially polymerized and cross-linked, products in an oleaginous vehicle, a superior, readily reproducible, tacky but fluid lubricant can be prepared. The superiority of our lubricants has been demonstrated experimentally by comparison of the results obtained with representative examples of them and of conventional, wood-rosin-containing lubricants in the U.S. Steel Retention Test, sometimes known as the Timken Four-Ball Test. In this test, four grams of the test lubricant are placed in the test cup and run under a 43-pound beam load until failure occurs. Two runs of thirty minutes (1800 seconds), or the longest run out of a series of three, is the measured indication of rentention ability. The purpose of the test is to simulate the lubrication of open gears operating for long periods without replenishment of the lubricant. The compositions of the experimental and commercial lubricants, and the results obtained in the tests, were as follows:

TABLE IX.—GREASE SAMPLE DESIGNATION

| Components (% w.) | Commercial formulation | No. 1 | No. 2 | No. 3 |
|---|---|---|---|---|
| Asphalt | 32.0 | 32.0 | 32.0 | 32.0 |
| Bright Stock Extract (No. 42) | 35.0 | 35.0 | 35.0 | 35.0 |
| 200/90 Neutral Oil | 23.0 | 23.5 | 23.5 | 23.8 |
| Wax Tailings | 3.0 | | | |
| PAD Resin | | 3.0 | 3.0 | 3.0 |
| Lead Naphthenate | 6.0 | 6.0 | 6.0 | 6.0 |
| Rosin K (Wood Rosin) | 1.0 | | | |
| Reaction Product of Ex. XII | | 0.50 | | |
| Reaction Product of Ex. XIII | | | 0.50 | 0.20 |
| Viscosity at 210° F., SUS | 515.4 | 474.6 | 477.8 | |
| U.S. Steel Retention Test (Timken four-gram, 43-pound beam load), sec.: | | | | |
| (1) | 1,412 | >1,800 | >1,800 | 1,050 |
| (2) | 1,160 | | | |
| (3) | 1,217 | | | |

The compositions of this invention are not dependent upon Rosin K or similar natural resins for adhesiveness and exhibit superior adhering properties in comparison with compositions containing such resins. The 200/90 Neutral used in the foregoing formulations exhibited the following properties:

TABLE X

| | |
|---|---|
| Gravity ° API at 60° F. | 29.5 |
| Sp. gr. | 0.8789 |
| Flash, ° F. | 435 |
| Fire, ° F. | 500 |
| Vis. at 100° F., SUS | 201.9 |
| Vis. at 130° F., SUS | 105.3 |
| Vis. at 210° F., SUS | 46.1 |
| Color (ASTM D-1500) | <1.5 |
| Pour point, ° F. | −5.0 |
| Vis. index | 92 |
| Percent sulfur | 0.33 |
| Neut. No. | <0.03 |

The wax tailings had a gravity, ° API at 60° F. of 6.5, a flash point of 470° F., a fire point of 595° F., a needle penetration of 44 and a softening point of 116.5° F. The Rosin K had a sp. gr. of 1.07, a flash point of 400° F. and a softening point, R & B, of 168. The neutral oil extract, bright stock extract described in Patent 2,910,440, and any of the extracts listed herein can be used in the compositions of this invention.

The PAD resin as described in Patent 2,910,440 comprises polymerized methyl esters of rosin obtained as a residue from the vacuum distillation of dark methyl ester of rosin. These materials have a mol. wt. of about 760, a melting point of 212° F. and an acid number of 15. In one aspect of this invention about 1.0 to 15% by weight of this resin is incorporated along with the partially polymerized epoxy resins described herein.

Lead naphthenate is a known ingredient for imparting extreme pressure properties. In addition to the other extreme pressure addends described herein, in place of all or part of the extreme pressure addend proportions of the compositions of this invention, any of the known metal salts that have this property may be used, e.g., cobalt naphthenate, zinc naphthenate, copper naphthenate, lead dithiocarbamate, zinc dithiocarbamate, lead dithiophosphate and the like. The proportion of extreme pressure agent may vary from 0 to about 10% by wt.

In practice several grades of gear oils or gear shield compositions are prepared depending on their viscosities. As an example, one grade may have a viscosity ranging from about 4450–4550 SUS at 210° F. (measured without solvent). For such a composition about 46% to 50% of asphalt and 34% to 36% of solvent extract would be used. Another grade of gear shield oil may have a viscosity of about 2200–2300 SUS at 210° F. Such a composition would contain about 35% to 37% asphalt or other equivalent material and 44% to 45% solvent extract. Still another grade of gear-shield composition, having a viscosity of about 450 to 650 SUS at 210° F., would contain less amounts of asphalt and solvent extract as would the lowest viscosity grades of gear-shield compositions. Where the use of a solvent such as naphthol (a fraction from the kerosene boiling range hydrocarbons) and other known diluents is necessitated for purposes of forming a composition that can be readily handled and applied to the gear surfaces, generally about 5 to 10% by wt. and preferably about 6.5% by wt. of said solvent is recommended. The solvent evaporates under ambient conditions and leaves a protective coating of the composition on the machinery surfaces. Accordingly, the asphalt content may vary from 30 to 50% by wt., the solvent extract content from 30 to 45% by wt. with the other ingredients, along with 0.1 to 1.0 wt. percent of the polymerized epoxy resin making up the balance.

The compositions of this invention need not contain the PAD resin or the Rosin K or the wax tailings. This is illustrated by the following examples of additional compositions coming within the scope of this invention

TABLE XI.—GEAR SHIELD COMPOSITIONS

| No. | Ingredient | Wt. percent |
|---|---|---|
| No. 4 | Asphalt | 33.0 |
|  | Extract No. 44 | 36.0 |
|  | 200/90 neutral oil | 24.5 |
|  | Zinc naphthenate | 6.0 |
|  | Reaction product of Example VI | 0.50 |
| No. 5 | Asphalt | 35.0 |
|  | Extract No. 45 | 34.0 |
|  | 200/90 neutral oil | 23.5 |
|  | Lead dithiocarbamate | 6.5 |
|  | Reaction product of Example V | 1.0 |
| No. 6 | Asphalt | 36.0 |
|  | Extract No. 41 | 34.0 |
|  | 200/90 neutral oil | 22.5 |
|  | Zinc dithiocarbamate | 7.4 |
|  | Reaction product of Example IV | 0.1 |
| No. 7 | Asphalt | 37.0 |
|  | Extract No. 42 | 33.0 |
|  | 200/90 neutral oil | 21.5 |
|  | Lead dithiophosphate | 8.3 |
|  | Reaction product of Example III | 0.2 |

The extreme pressure agents described in United States Patents 2,968,619 by G. Bernard; 2,885,363 by G. Wolfram and J. B. Stucker; 2,900,342 by A. Manteuffel, G. Cook and W. Cortiss; 2,910,438 by P. Chapman and A. Manteuffel; 2,929,778 by A. Manteuffel, G. Ayres and W. Gilson and 2,830,952 by A. Manteuffel, E. Brennan and J. Stucker may be used. In addition various known viscosity-index improvers, pour-point depressants, foam depressants, rust inhibitors, e.g., such materials as polyisobutylene derivatives, polymerized esters of acrylic acids and higher fatty alcohols, mixtures of such esters (mol. wt. 5000 to 20,000), phenol halogenated wax ester condensation products, dibenzyldisulfide, polyethyl siloxanes, and metal salts of petroleum sulfonic acids may be used in approximate amounts where desired.

In a separate series of experiments a mixture of one part of the modified epoxy resin and one part of 200/90 neutral oil were mixed at room temperature. There appeared to be no solution of the modified epoxy resin. Upon heating to 200° F. the solubility of the modified epoxy resin did not increase. One part of solvent extract was added making a mixture comprising about 33% solvent extract, 33% mineral oil and 33% modified epoxy resin. Complete solubility of the modified resin was not obtained even on heating to 200° F. The addition of one part of asphalt, producing a composition containing about 25% of each ingredient, produced a solution of the modified resin as did the addition of another portion of asphalt wherein the total composition was 20% modified epoxy resin, 20% mineral oil, 20% extract and 40% asphalt. The compositions so far prepared did not exhibit more than the expected tackiness. However, the addition of 1% of the PAD resin resulted in a tacky cohesive mass, suitable for the purposes of this invention. The modified epoxy resin exhibited the property of amplifying the tackiness imparted by the PAD resin.

The partially or totally polymerized reaction products of the epoxy resins with an epoxide diluent and mono-, di-, and polycarboxylic acids derived from solvent extracts obtained in the solvent refining of mineral lubricating oils can be incorporated in any oleaginous vehicle. Preferably, the oleaginous vehicle is a viscous hydrocarbon oil or viscous residual oil obtained from the production of lubricating oils. The viscous oils which are used as the base for these adhesive lubricants may be the residues from the distillation of lubricating oils, or preferably the solvent-extracts from the solvent-refining of lubricating oils. These oils may be used alone or blended with other oils or with asphalt to produce base oils of the desired viscosity, which may then be provided with the desired adhesiveness by addition of the polymerized methyl esters of rosin.

In preparing adhesive lubricants of this type the various components are merely placed together in any conventional mixing apparatus that is capable of thoroughly mixing viscous fluids. The mixture is heated to an elevated temperature, usually about 300°–325° F., and thoroughly mixed. Conventional grease-compounding kettles are especially well suited for this purpose, since they are capable of imparting the high shear that is necessary for thorough mixing of viscous fluids.

Since the asphalt is normally solid it is incorporated, either in the form of chunks, or as a molten mass heated to about 350° F. in the solvent extract, and the mixture is heated to a temperature of about 200° to 300° F. The best procedure is to add the EP additive last and at a temperature below about 200° F., to avoid any possible reaction or destruction of the basicity of the additives.

The compositions of this invention may be used for wire lubricants and for lubricating exposed gears. The compositions pass the critical tests for such lubricants described in United States Patent 2,910,440. The viscosities of the finished products may be varied and in general may range from 450 to 5100 or above (SUS at 210° F.). Satisfactory lubricants can be made by using residual oils from the preparation of lubricating oils, e.g., tube-still bottoms, as in U.S. Patent 2,716,085, or a blend of solvent extracts, as described herein, with or without the addition of neutral oils. The bright stock extract used in the examples is comaprable to Extract No. 42 of Table III. At concentrations above the amounts specified herein, the increase in adhesive properties in disproportionate to the added cost of the additive. At concentrations below these limits the adhesive characteristics are satisfactory, but decrease in proportion to the concentration of the additive. Thus, the lower concentrations of additives may be used for less viscous oils where less adhesion is required. In the formulation of less viscous adhesive oil compositions, in the general range of the composition 1, 2 and 3 disclosed, compositions including 30 to 35% by weight of asphalt, 30 to 35% by weight of solvent extract from solvent refining of 150 vis. bright stock, 20 to 25% by weight of neutral oils and 0.10 to 1.00% of the novel reaction product disclosed herein may be used as satisfactory adhesive lubricants for the purposes indicated. The more viscous grades of adhesive lubricant compositions are prepared by blending 35 to 50% by weight of asphalt, 30 to 45% by weight of slovent extract from 150 vis. bright stock manufacture, and 0.10 to 1.00% of the polymerized epoxy-EPA additive. As is apparent from the foregoing description, the exact ranges of percentages of the oil base, asphalt, and polymerized epoxy-EPA additive are not well defined since these proportions may be varied to produce lubricants of varying viscosity and adhesiveness, depending on the type of adhesive lubricant needed and the cost of preparing same.

The various percentages disclosed and used herein are meerly illustrative and can be varied to account for the physical properties of the individual species of ingredients chosen. Where the lower percentages of both asphalt and solvent extracts are used in a composition, the balance of the oleaginous part of the composition is made up with a mineral lubricating oil or fraction thereof as a similar inert carrier legend, also preferably having some lubricity, so that the specified ranges of E.P. agent, if used, and PAD resin, if used, can be incorporated with the modified epoxy resin adhesive agents of this invention. Where intermediate amounts of asphalt and extract are employed, the balance of the oleaginous part of the composition is adjusted downwardly, depending on the desired viscosity of the end product, so that the amounts of PAD resin, E.P. agent and/or the modified epoxy resins adhesive agent of this invention when incorporated in the amounts herein specified gives the desired adhesion to the metal surfaces. And where the larger amounts of asphalt and extract are used together the omission of an additional oleaginous vehicle, such as neutral or bright stock oils, is contemplated or lesser amounts, in the order of 1–20%, may be used to adjust the viscosity of the end product, while using at least the minimum specified quantities of the modified epoxy resin adhesive of this invention, with or without the PAD resin and E.P. agent.

For some application, it is contemplated that other addends such as corrosion inhibitors, pour-point depressers, VI improvers and similar known addends be incorporated in place of or along with the PAD resin and/or E.P. agent. Thus, the invention is directed to a composition of matter comprising an oleaginous vehicle or viscous residual oil and a sufficient amount of a partially or wholly polymerized epoxy resin or mixture of such modified resins as herein described, to impart adhesiveness to the composition. For this purpose, between about 0.1 to 10% by weight of the modified resin is used in the oleaginous vehicle or viscous residual oil, as demonstrated by examples similar to those described in the separate series of experiments herein.

The embodiments of the invention in which an exclusive property or privilege is claimed are defined as follows.

1. A composition of matter comprising a major portion of a mineral lubricating oil vehicle and about 0.1 to 10% by weight of the polymerized and esterified reaction product of
   (1) polyepoxy monomers consisting of only the elements carbon, hydrogen and oxygen, having terminal epoxy groups attached to adjacent carbon atoms, a molecular weight of about 1000 to 3000 and an epoxide equivalent of at least about 140, and
   (2) complex polynuclear aromatic carboxylic acids derived from solvent extracts obtaind in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulphur, having a molecular weight of above about 300 and having 1.7 to 3.5 average number of aromatic rings per aromatic molecule, said reaction being conducted by heating said polyepoxy monomer with about 10% to 50% by weight of said complex carboxylic acids, based on the weight of said monomers, at a temperature of about 250° to 370° F. in the presence of a tertiary amine catalyst.

2. A composition of matter in accordance with claim 1 in which said reaction product is prepared in the presence of about 0.2 to 1.5% by weight of a tertiary amine catalyst of the group consisting of pyridine, picoline, quinoline, isoquinoline, trialkyl amines, alkylaryl amines and alkyl substituted aminophenols, based on the total charge of reactants.

3. A composition of matter in accordance with claim 1 in which said reaction product is prepared in the presence of about 5 to 20 wt. percent of a non-viscous epoxide diluent of the group consisting of epichlorohydrin, phenyl glycidyl ether, dicyclopentadiene dioxide, vinyl cyclohexene dioxide and resocinol diglycidyl ether, based on the total charge of reactants.

4. A composition of matter in accordance with claim 1 in which said complex polynuclear aromatic carboxylic acids are characterized by having an average molecular weight of about 325 to 470, an acid number of about 140 to 300, a melting point of about 60° to 100° C. and contain about 1.05 to 2.5 weight percent of combined sulfur.

5. A composition of matter in accordance with claim 1 in which said mineral lubricating oil vehicle comprises substantially equal portions of a neutral lubricating oil and asphalt.

6. A composition of matter in accordance with claim 5 containing about 1.0 to 15% by wt. of dark polymerized methyl esters of rosin obtained as the residue from the vacuum distillation of the dark methyl ester of rosin.

7. A composition of matter in accordane with claim 1 containing a minor amount sufficient to impart extreme pressure properties of an extreme pressure agent of the group consisting of lead naphthenate, cobalt naphthenate, zinc naphthenate, copper naphthenate, lead dithiocarbamate, zinc dithiocarbamate and lead dithiophosphate.

8. An adhesive gear lubricant comprising a major portion of a mineral lubricating oil vehicle and about 0.1 to 1.0% by wt. of the polymerized and cross-linked reaction product of
   (1) polyepoxy monomers consisting of only the elements carbon, hydrogen and oxygen, having terminal epoxy groups attached to adjacent carbon atoms, a molecular weight of about 1000 to 3000 and an epoxy equivalent of at least about 140, and (2) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex polynuclear aromatic, alkyl-aromatic acids predominating in carbon and hydrogen, containing about 0.5 to 4.5 wt. percent of sulfur, having a molecular weight of above about 300 and having 1.7 to 3.5 average number of aromatic rings per aromatic molecule, said reaction being conducted by heating said polyepoxy monomer with about 10% to 50% by weight of said complex carboxylic acids, based on the weight of said monomers, at a temperature of about 250° to 370° F. in the presence of a tertiary amine catalyst.

9. An adhesive gear lubricant consisting essentially of a major portion of a mineral lubricating oil vehicle and about 0.1 to 1.0% by wt. of the polymerized and cross-linked sequential reaction product of
(1) epihalohydrin
(2) bis-(4-hydroxyphenyl)dimethylmethane and
(3) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulfur, having a molecular weight of above about 300 and having 1.7 to 3.5 average number or aromatic rings per aromatic molecule, said reaction being conducted by heating about 10% to about 50% by weight of said complex carboxylic acids, based on the weight of the reaction product of (1) and (2), at a temperature of about 250° to 370° F. in the presence of about 0.2 to 1.5% by weight of pyridine.

10. An adhesive gear lubricant in accordance with claim 9 in which said complex polynuclear aromatic carboxylic acids are characterized by having an average molecular weight of about 325 to 470, an acid number of about 140 to 300, a melting point of about 60° to 100° C. and contain about 1.05 to 2.5 weight percent of combined sulfur.

11. An adhesive gear lubricant in accordance with claim 9 in which said mineral lubricating oil vehicle comprises substantially equal portions of a 200 SUS vis. at 100° F., 90 VI neutral lubricating oil and asphalt.

12. An adhesive gear lubricant in accordance with claim 11 containing about 1.0 to 15% by wt. of dark polymerized methyl esters of rosin obtained as the residue from the vacuum distillation of the dark methyl ester of rosin.

13. An adhesive gear-shield lubricant consisting essentially of about 30 to 50% by wt. of asphalt, about 30 to 45% by wt. of solvent extracts obtained in the solvent extraction of mineral lubricating oils, about 20 to 25% by wt. of neutral oil, up to about 10% by wt. of an extreme pressure agent of the group consisting of lead naphthenate, cobalt naphthenate, zinc naphthenate, copper naphthenate, lead dithiocarbamate, zinc dithiocarbamate and lead dithiophosphate, about 1 to 15% by wt. of the dark polymerized methyl esters of rosin and about 0.1 to about 10% by wt. of the polymerized cross-linked and esterified reaction product of
(1) polyepoxy monomers consisting of only the elements carbon, hydrogen and oxygen, having terminal epoxy groups attached to adjacent carbon atoms, a molecular weight of about 1000 to 3000 and an epoxide equivalent of at least about 140, and
(2) complex polynuclear aromatic carboxylic acids derived from phenol extracts obtained in the refining of mineral lubricating oils by metalation of said solvent extracts to form the sodium adduct, carbonation of said adduct to form the corresponding sodium salt of the carboxylic acid and acidification of said salt to form the free carboxylic acid characterized by being complex, polynuclear aromatic, alkyl-aromatic acids predominating in carbon and hydrogen, containing about 0.5 to 4.5 wt. percent of sulfur, having a molecular weight of above about 300 and having 1.7 to 3.5 average number of aromatic rings per aromatic molecule, said reaction being conducted by heating said polyepoxy monomer with about 10% to 50% by weight of said complex carboxylic acids, based on the weight of said monomers, at a temperature of about 250° to 370° F. in the presence of a tertiary amine catalyst.

14. A gear shield lubricant in accordance with claim 13 in which said polyepoxy monomer is the reaction product of epichlorohydrin and bis-(4-hydroxyphenyl) dimethylmethane.

15. A gear-shield lubricant in accordance with claim 13 consisting essentially of about 32% by wt. of asphalt, about 35% by wt. of solvent extracts obtained in the solvent extraction of mineral lubricating oils, about 23.5% by wt. of mineral lubricating oil, about 6.0% by wt. of lead naphthenate, about 3.0% by wt. of dark polymerized methyl esters of rosin obtained as the residue from the vacuum distillation of the dark methyl ester of rosin and about 0.5% by wt. of said polymerized, cross-linked and esterified reaction product.

16. A gear-shield lubricant in accordance with claim 15 in which the concentration of said mineral lubricating oil is about 23.8% by wt. and the concentration of said polymerized, cross-linked and esterified reaction product is about 0.2% by wt.

References Cited by the Examiner

UNITED STATES PATENTS

| | | | |
|---|---|---|---|
| 2,623,023 | 12/1952 | Koroly | 260—47 |
| 2,935,488 | 5/1960 | Phillips et al. | 260—47 |

DANIEL E. WYMAN, *Primary Examiner.*

JOSEPH R. LIBERMAN, *Examiner.*